(12) United States Patent
Balasubramonian et al.

(10) Patent No.: US 12,273,248 B2
(45) Date of Patent: Apr. 8, 2025

(54) LINK-QUALITY ESTIMATION AND ANOMALY DETECTION IN HIGH-SPEED WIRELINE RECEIVERS

(71) Applicant: Marvell Asia Pte Ltd, Singapore (SG)

(72) Inventors: Venugopal Balasubramonian, San Jose, CA (US); Lenin Kumar Patra, Dublin, CA (US)

(73) Assignee: Marvell Asia Pte Ltd, Singapore (SG)

( * ) Notice: Subject to any disclaimer, the term of this patent is extended or adjusted under 35 U.S.C. 154(b) by 4 days.

(21) Appl. No.: 17/585,618

(22) Filed: Jan. 27, 2022

(65) Prior Publication Data

US 2022/0247652 A1 Aug. 4, 2022

Related U.S. Application Data

(60) Provisional application No. 63/143,577, filed on Jan. 29, 2021.

(51) Int. Cl.
*H04L 43/08* (2022.01)
*H04L 43/16* (2022.01)
*H04L 47/24* (2022.01)

(52) U.S. Cl.
CPC .............. *H04L 43/08* (2013.01); *H04L 43/16* (2013.01); *H04L 47/24* (2013.01)

(58) Field of Classification Search
CPC ......... H04L 43/08; H04L 43/16; H04L 47/24; H04L 1/002; H04L 1/0002; H04L 1/0009; H04L 1/20
See application file for complete search history.

(56) References Cited

U.S. PATENT DOCUMENTS

| 6,178,448 | B1* | 1/2001 | Gray | H04L 47/10 |
| | | | | 709/224 |
| 9,106,462 | B1 | 8/2015 | Aziz et al. | |
| 9,210,008 | B2 | 12/2015 | Rane | |
| 9,325,537 | B2 | 4/2016 | Mobin et al. | |
| 10,419,250 | B1 | 9/2019 | Taylor | |
| 11,381,474 | B1* | 7/2022 | Kumar | H04L 41/0896 |
| 2008/0155373 | A1* | 6/2008 | Friedman | H04L 1/0003 |
| | | | | 375/232 |
| 2008/0285443 | A1* | 11/2008 | Connolly | H04B 3/46 |
| | | | | 375/232 |
| 2015/0124976 | A1* | 5/2015 | Pedersen | A61N 1/36038 |
| | | | | 381/23.1 |

(Continued)

OTHER PUBLICATIONS

Suleiman, "Model Predictive Control Equalization for High-Speed IO Links," M.Sc. Thesis, Massachusetts Institute of Technology, pp. 1-53, Jun. 2013.

(Continued)

*Primary Examiner* — Jeffrey R Swearingen
(74) *Attorney, Agent, or Firm* — Meitar Patents Ltd.; Daniel Kligler (57) ABSTRACT

An integrated Circuit (IC) for use in a network device includes a receiver and a Link Quality Estimation Circuit (LQEC). The receiver is configured to receive a signal over a link and to process the received signal. The LQEC is configured to predict a link quality measure indicative of communication quality over the link in the future, by analyzing at least one or more settings of circuitry of the receiver, and to initiate a responsive action depending on the predicted link quality measure.

16 Claims, 7 Drawing Sheets

(56) References Cited

U.S. PATENT DOCUMENTS

| | | |
|---|---|---|
| 2016/0219533 A1 | 7/2016 | Sahlin et al. |
| 2016/0233957 A1* | 8/2016 | Guo .................. H04B 10/27 |
| 2016/0328356 A1* | 11/2016 | Lesartre ............. G06F 13/4286 |
| 2019/0028236 A1* | 1/2019 | Tonietto ............... H04L 1/0009 |
| 2019/0044824 A1* | 2/2019 | Yadav .................. H04W 24/08 |
| 2021/0288590 A1 | 9/2021 | Cho et al. |

OTHER PUBLICATIONS

Analog Devices, Inc., "High Speed Variable Gain Amplifiers (VGAs)," MT-073 Tutorial, pp. 1-9, year 2009.

Gregor et al., "Deep AutoRegressive Networks," Proceedings of the 31st International Conference on Machine Learning, JMLR: W&CP, vol. 32, pp. 1-9, year 2014.

Jain et al., "Structural-RNN: Deep Learning on Spatio-Temporal Graphs," CVPR Paper, Open Access Version, pp. 5308-5317, year 2015.

Palermo, "Lecture 8: RX FIR, CTLE, DFE, & Adaptive Eq.," ECEN720: High-Speed Links, Circuits and Systems, Analog & Mixed Signal Center, Texas, A&M University, pp. 1-49, spring 2021.

Athavale et al.: "High-Speed Serial I/O Made Simple—A Designers' Guide, with FPGA Applications," Connectivity Solutions, Preliminary Edition 1.0, pp. 1-210, Apr. 2005.

EP Application # 22154035.4 Search Report dated Jul. 6, 2022.

EP Application # 22154035.4 Office Action dated May 13, 2024.

\* cited by examiner

LINK-QUALITY ESTIMATION AND ANOMALY DETECTION IN HIGH-SPEED WIRELINE RECEIVERS

CROSS-REFERENCE TO RELATED APPLICATIONS

This application claims the benefit of U.S. Provisional Patent Application 63/143,577, filed Jan. 29, 2021, whose disclosure is incorporated herein by reference.

FIELD OF THE DISCLOSURE

The present disclosure relates generally to high-speed receivers, and particularly to methods and systems for link quality estimation in high-speed wireline receivers.

BACKGROUND

High speed receivers, and particularly receivers incorporating high-speed de-serializers (SERDESs), may comprise circuitry to estimate the link quality.

SUMMARY

An embodiment that is described herein provides an Integrated Circuit (IC) for use in a network device. The IC includes a receiver and a Link Quality Estimation Circuit (LQEC). The receiver is configured to receive a signal over a link and to process the received signal. The LQEC is configured to predict a link quality measure indicative of communication quality over the link in the future, by analyzing at least one or more settings of circuitry of the receiver, and to initiate a responsive action depending on the predicted link quality measure.

In an embodiment, the LQEC is configured to initiate the responsive action by initiating a diversion of subsequent communication, at least partially, from the link to another link. In a disclosed embodiment, by analyzing the settings of the circuitry of the receiver over time, the LQEC is configured to predict a future value or trend of the link quality measure, and to initiate the responsive action depending on the predicted future value or trend. In an example embodiment, the LQEC is configured to initiate the responsive action in response to determining that the link quality measure is predicted to drop below a quality threshold.

In some embodiments, the LQEC is configured to predict the link quality measure by jointly analyzing (i) the one or more settings of the circuitry of the receiver, and (ii) one or more parameters of the received signal. In disclosed embodiments, the LQEC is configured to predict the link quality measure by operating a pre-trained Machine Learning (ML) model on at least the one or more settings of the circuitry of the receiver.

In an embodiment, the LQEC is configured to initiate the responsive action by initiating a decrease of a data rate of the signal. In another embodiment, the LQEC is configured to initiate the responsive action by initiating a change in an encoding scheme used for encoding the signal. In an example embodiment, the LQEC is configured to predict the link quality measure by analyzing, over time, at least one setting of the circuitry of the receiver, selected from among (i) a gain of a Clock Data Recovery (CDR) circuit, (ii) a bandwidth of the CDR circuit, (iii) a response of an analog equalization filter, (iv) a setting of an Analog to Digital Converter (ADC), (v) tap values of a digital equalizer, (vi) an Automatic Gain Control (AGC) setting, and (vii) a slicer threshold.

In some embodiments, the IC further includes one or more additional receivers configured to receive, process and demodulate one or more additional signals over one or more additional links, and one or more additional LQECs configured to predict one or more additional link quality measures for communication over the one or more additional links based on analysis of the link quality measures of the one or more additional links. In an embodiment, the IC further includes a processor configured to calculate a system-level health metric for a network system, or part of the network system, based on the link quality measure and the one or more additional link quality measures and to govern traffic distribution responsively to the calculated system-level health metric.

In some embodiments the receiver is disposed in a deserializer.

There is additionally provided, in accordance with an embodiment that is described herein, a method for use in a network device. The method includes, using a receiver, receiving a signal over a link and processing the received signal. A link quality measure, indicative of communication quality over the link in the future, is predicted by analyzing at least one or more settings of circuitry of the receiver. A responsive action is initiated depending on the predicted link quality measure.

The present disclosure will be more fully understood from the following detailed description of the embodiments thereof, taken together with the drawings in which:

DETAILED DESCRIPTION OF EMBODIMENTS

Fast receivers, and, particularly, Serializer-Deserializer (SerDes) receivers are critical building blocks for high-speed serial links in networking, compute, and storage applications. As signaling speeds increase, the channel losses for a required physical reach increases and link margins decrease. Consequently, more sophisticated receiver designs become necessary to meet a given bit-error rate (BER) requirement. SerDes receivers have thus evolved from input ports with simple boost filters to complex receivers with advanced equalization structures such as multi-tap feedforward equalizer (FFE) and decision-feedback-equalizer (DFE).

The move to higher speeds, including the adoption of higher order encoding schemes such as PAM4, results in more complex receiver architectures and implementations. In some applications, the receiver, which typically can have up to 40 or 50 operational parameters, is tuned using blind adaptation (no training pattern), resulting in variation between adaptation runs. Accurate link quality metrics and detection of anomalous link and operating conditions are crucial to ensure highly reliable operation of systems employing high speed. SerDes inputs.

Receivers may use measures such as slicer Signal to Noise Ratio (SNR), bit error rates (BER), eve-margin such as Vertical eye opening and Horizontal eye opening and. similar as link quality indicators; these metrics, however, have inherent variability due to circuit variations (e.g., manufacturing related variations in transistor sizes) and adaptation variations (e.g., variations in the calculations of the link quality indicators), and thus are not necessarily sufficient for high accuracy link margin. measurement or robust detection of anomalies such as non-optimal adaptations.

For example, a high AGC gain setting may indicate high link attenuation but may also be associated with a burst of low-logic-level symbols and, hence, the gain setting, if not supported by other settings, may not serve as a reliable link quality indicator. Moreover, such indicators do not predict future link quality, and typically cannot predict that a link is trending towards failure or that it is about to fail, until it is too late to take remedial measures to prevent data loss.

Embodiments that are disclosed herein provide highly accurate link quality estimations and link quality predictions, by analyzing one or more settings of the receiver. In some embodiments, the receiver settings are analyzed jointly with one or more parameters of the received signal to produce the desired link quality estimations and/or predictions. In embodiments, the joint analysis of the receiver parameters is tracked in temporal domain to generate metrics predictive of the future quality of the link. In other embodiments the analysis is performed. using machine-learning (ML) and sequence detection and classification techniques.

By predicting that link quality of a given link is trending towards falling below a minimum requirement for link quality, remedial measures can be taken in due time to divert some or all data traffic on a deteriorating link to a different link. Conversely, by predicting that link quality of the given link is trending to exceed a specified link quality metric, data traffic on the link can be increased above a specified maximum capacity to provide increased data carrying capacity for the network.

In an embodiment, the receiver comprises submodules, including an Automatic Gain Control (AGC), a Continuous-Time Linear Equalizer (CTLE), an Analog to Digital Converter (ADC), a Feed-Forward-Equalizer (FFE), a Decision-Feedback Equalizer (DFE) and multi-level-decoding slicers. The receiver attempts to optimize the settings of the various submodules for better performance (e.g., better signal-to-noise-ratio (SNR), wider eye margins and better bit-error-rate (BER)). In an embodiment, the receiver further comprises a Link-Quality Estimation Circuit (LQEC), that is configured to estimate the link quality and/or to predict the future link quality, based on the current and the history of the setting of the sub-modules.

In some embodiments, the LQEC comprises a machine-learning (ML) inference model, that estimates and predicts the future link quality, using the current and the history of the setting of the sub-modules as inputs, and with weights and activation functions that are preset by an ML training session. In an embodiment, a full data transfer path simulation environment is used to produce the ML inputs. In some embodiments, the simulation environment includes models of a transmitter, a cable with connectors, and the receiver.

In embodiments, when producing the ML input, a computer (or a plurality of coupled computers) varies the simulation parameters including (but not limited to) transmitter phase and gain noise, transmitter non-linearities, litter, cable attenuation, cable crosstalk, cable reflection and receiver parameters subjected to process-voltage-temperature (PVT) variations. The settings of the receiver, the parameters of the signal and the link quality are monitored and then used to train the ML model for minimal link quality estimation error. The optimized parameters (which can include the history of the parameters in some embodiments), including weights and activation functions, can then be used to set the ML inference model (i.e., the LQEC) parameters, to accurately estimate and predict the link quality, responsively to the receiver settings and signal parameters.

In some embodiments, a network device in a distributed system that is connected to a communication network comprises a processor and one or more receivers, each receiver comprising an LQEC (in an embodiment, a plurality of receivers may share an LQEC). The network device receives data from a peer network device, through the network and through a receiver that is coupled to a first input port. When the LQEC predicts that the corresponding link is about to fail (e.g., that a measure of the predicted link quality will be below a preset threshold), the processor (also referred to as a "host processor") sends a reroute message to the peer network device, which may then transmit further data to a second port (and, hence, through a second link and to a second receiver). If the prediction is sufficiently early, data integrity may be preserved.

In some embodiments, the LQEC generates link quality metrics that can be aggregated and jointly analyzed with. link quality metrics from other receivers in the system to generate additional predictive metrics related to system level margins. In these embodiments, machine learning (ML) and deep learning (DL) techniques are used for the joint analysis of the link quality metrics from a large number of ports (we will use the term. Machine Learning (ML) below as inclusive to the term Deep Learning (DL)). In some embodiments, this joint analysis will incorporate other system level metrics in addition to the link quality metrics to enhance the accuracy of the predictions. This specific embodiment of the invention is applicable and valuable for applications that utilize a large number of instantiations of such high-speed wireline receivers.

Lastly, in some embodiments, the bitrate might need to change as the link quality changes. In such an embodiment, a processor may increase or decrease the receiver data citrate responsively to the link quality estimation and prediction.

In embodiments that are described herein, machine learning (ML) and Deep Learning (DL) techniques are used to reliably estimate and predict link quality in high speed SerDes receivers.

Figure 1:
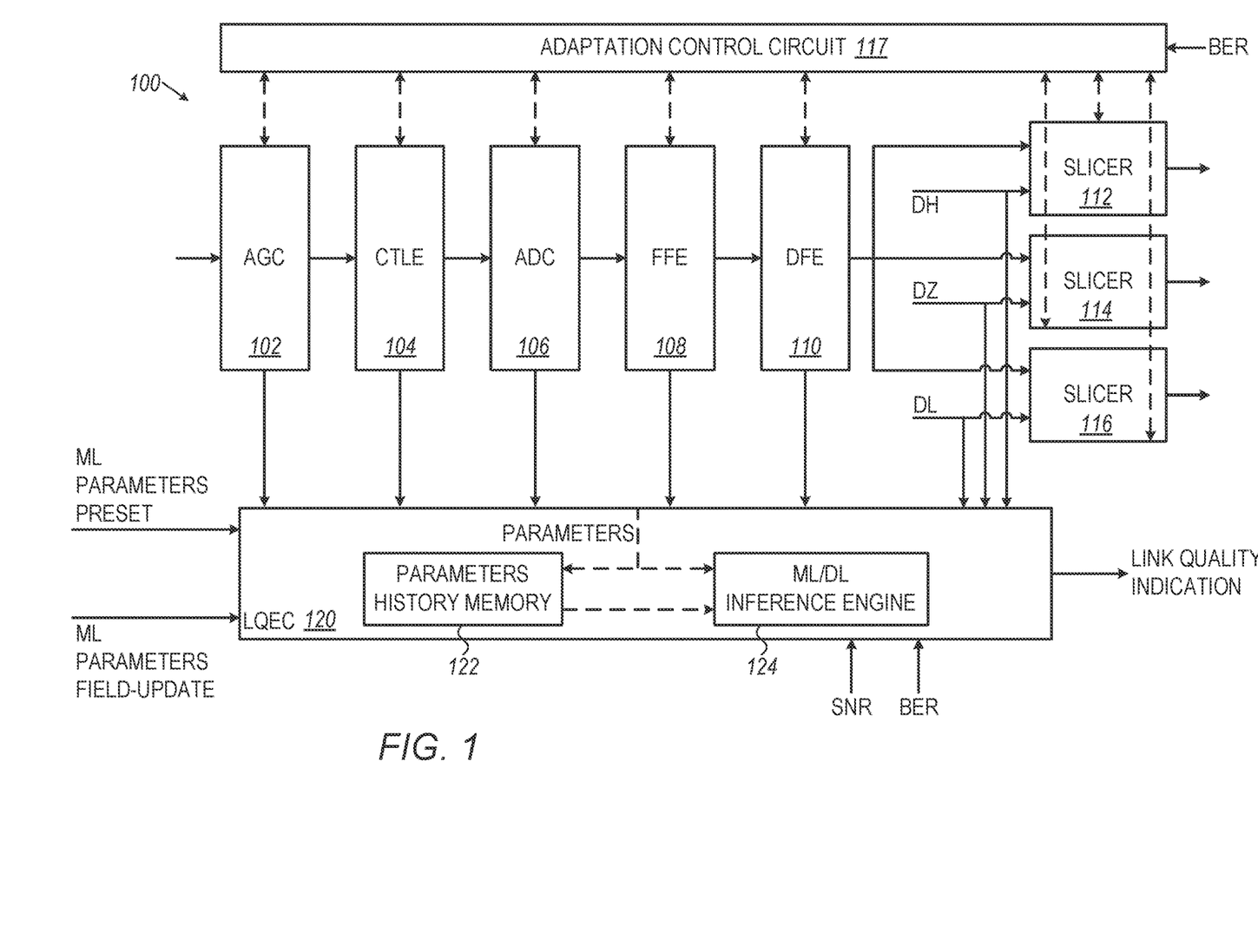
FIG. 1 is a block diagram that schematically illustrates a high-speed wireline receiver with a link quality estimation circuit (LQEC), in accordance with an embodiment that is described herein.

FIG. 1 is a block diagram that schematically illustrates a High-Speed Wireline Receiver 100 with a link quality estimation circuit, in accordance with an embodiment that is described herein. In a non-limiting example embodiment, receiver 100 is part of a deserializer in a port of a network device.

Receiver 100 comprises, in an embodiment, an Automatic Gain Control (AGC) circuit 102, a Continuous-Time-Linear-Equalizer (CTLE) 104, art Analog-to-Digital-Converter (ADC) 106, a Feed-Forward Equalizer (FFE) 108, a Decision-Feedback-Equalizer (DFE) 110, a High-Threshold Slicer 112, a Medium-Threshold Slicer 114 and a Low-Threshold Slicer 116. In other embodiments, there may be fewer signal processing circuits or additional signal processing circuits not discussed herein.

In embodiments, AGC 102 is a circuit that automatically sets a gain that is applied to the input signal. A tutorial on high-speed variable gain amplifiers and automatic gain control circuits can be found in Analog Devices "High Speed Variable Gain Amplifiers" MT-073 tutorial (Rev. 0, 10/08).

CTLE 104 is a core analog building block of a wireline receiver front-end for signal equalization. An example of an inverter based CTLE can be found in U.S. Patent Application Publication 2021/0288590.

ADC 106 converts a high-speed input analog signal to digital representation, to allow better accuracy digital processing in further stages. In some embodiments, ADC 106 comprises a flash ADC, which compares the input signal to a plurality of reference voltages.

FFE 108 and DFE 110 are, respectively, a feed-forward and a decision-feedback equalizers; a description of high-speed equalization techniques, including FFE and DEF, can be found, for example, in A. Suleiman MIT master thesis titled "Model Predictive Control Equalization for High-Speed IO Links", Massachusetts Institute of Technology, June 2013.

In an embodiment, slicers 112, 114 and 116 compare the equalized input signal to three thresholds—DL, DZ, and DH. In Pulse-Amplitude-Modulation-4 (PAM4), there are four nominal signal levels—V0, V1, V2 and V3. Ideally, DL may be set to the average of V0 and V1; DZ may be set to the average of V1 and V2; and DH may be set to the average of V2 and V3. Thus, by examining the outputs of the three slicers, the transmitted PAM value can be determined. In. embodiments, the slicers continually change the threshold voltage, to adjust for DC variations (including DC noise) in the input signal.

While some (or all) of the signal processing circuits, including AGC 102, CTLE 104, ADC 106, FFE 108 and Slicers 112, 114, 116 may adjust the respective operating parameters to improve performance, better results may be achieved by system-level parameter optimization. In embodiments, wireline receiver 100 further comprises an Adaptation Control circuit 117. The Adaptation Control Circuit receives link quality measures, including BER and including quality measures from some or all the signal processing circuits. Responsively, the Adaptation Control. Circuit may set some or all the operating parameters of the signal processing circuits (in some embodiments, some signal processing circuits may set the operating parameters responsively to indication that the Adaptation Control Circuit sends, and to signal quality estimation that the signal processing circuit performs).

High-Speed Wireline Receiver 100 further comprises a Link-Quality Estimation Circuit (LQEC) 120 which, in turn in an embodiment, comprises a parameter history memory 122 to store the history of the receiver parameters and an ML/Deep-Learning (DL) inference engine 124. In an embodiment, the LQEC is configured to estimate a measure of the link quality, and to predict future values of the link quality measure, responsively to the receiver parameters and to the history of the receiver parameters. In some embodiments, the ML/DL inference engine of the LQEC is a pre-trained inference Machine-Learning (ML) model, and the LQEC outputs link-quality indications responsively to the pretrained inference model parameters (e.g., weights and decision functions) and to parameters that the LQEC ML/DL inference engine receives from the receiver's submodules and from the parameters history memory.

The parameters that the LQEC receives from the receiver's submodules may comprise, for example:

I. Gain setting of AGC 102.
II. Selected CTLE 104 curve characteristics (for example, G1 and G2 of the CTLE, described in U.S. Patent Application 2021/0288590).
III. Offsets measured at various points in the datapath
IV. Offsets, full-range settings and clipping ratio of ADC 106.
V. Bandwidth, peaking and adapted values of the CDR (Clock and Data Recovery) circuit
VI. Threshold voltages (DL, DZ, DH) of slicers 112, 114 and 116.
VII. Link Bit-Error-Rate (BER) measure (e.g., when the link data comprises error-detection codes).
VIII. Signal to Noise Ratio (SNR), which may be measured, for example, by slicers 112, 114 and 116.
IX. Parameter for the adaptation loops used to tune the receiver blocks In embodiments, the LQEC receives initial ML parameters when initially set, and may receive updated parameters during operation (for example, if the ML model is trained with additional data, including additional operational parameters and history of operational parameters).

In the foregoing we refer to link failure prediction; in the current context, link failure is defined as link quality measure below a preset threshold.

In some embodiments, The LQEC outputs link quality estimation only; in other embodiments, the LQEC may output a link quality prediction for the near future (e.g., odds of failure within the next 1 milli-second); in an embodiment, the LQEC may output a link quality metric that can be aggregated at a system level. As will be described below, having an early indication that a link may fail can prevent data loss in some embodiments, and, conversely, an early indication that a link quality will exceed a preset threshold may be used to increase the link bandwidth and, thus, optimize computing performance. In embodiments, increasing and decreasing the link bandwidth may be done responsively to link quality indications and predictions, and to other criteria, e.g., queue congestion.

The configuration of receiver 100, illustrated in FIG. 1 and described hereinabove is cited by way of example. Other receiver configurations may be used in alternative embodiments. For example, in some embodiments, an NRZ receiver may be used, eliminating the need for the three slicers; in an embodiment, FFE 108 is analog (and, hence, connected between CTLE 104 and ADC 106); in another embodiment, the ADC may not be present, resulting in a fully analog implementation of the equalization function.

In some embodiments, an ML model trained to estimate and predict link quality measures responsively to the parameters (static and/or historical) of high-speed Wireline receiver 100. The training data for the ML model is acquired by simulations.

Figure 2:
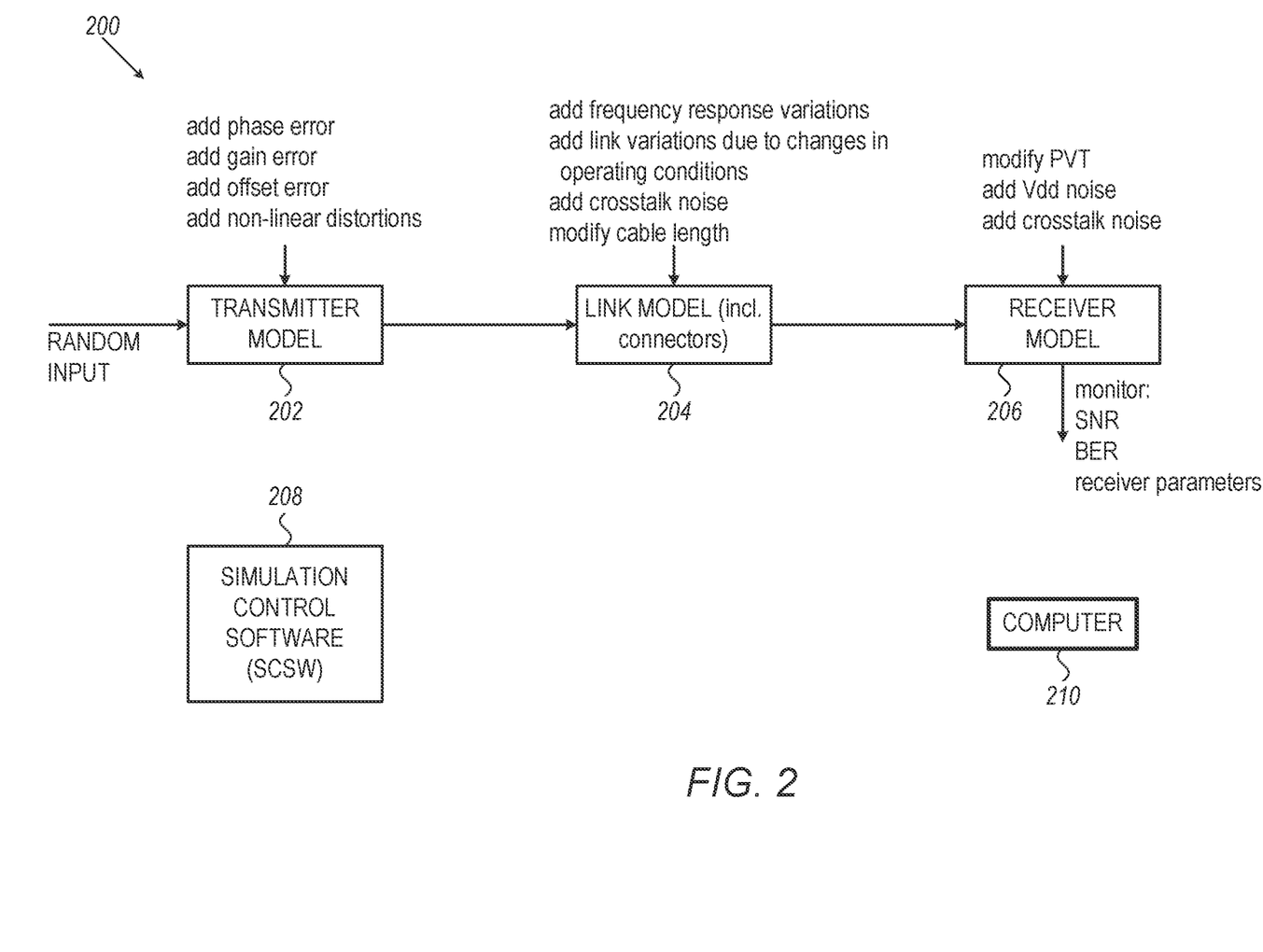
FIG. 2 is a block diagram that schematically illustrates the structure of a data-transfer simulation environment to simulate the receiver and link of FIG. 1, which generates input data for a link-quality estimation Machine Learning (ML) model, in accordance with an embodiment that is described herein.

FIG. 2 is a block diagram that schematically illustrates the configuration of a Data-Transfer Simulation Environment 200 to simulate the receiver link, which generates input data for a link-quality estimation ML model, in accordance with an embodiment that is described herein. Simulation model 200 may be written, for example, in a high-level programming language such as C/C++, Python, Matab or other, and include a Transmitter Model 202, a Link Model 204 and a Receiver Model 206.

Data Transfer Simulation Model 200 comprises a software model of the communication path. In embodiments, data transfer simulations simulate a complete path, from a transmitter that transmits data to Receiver 100 (FIG. 1), through a typical link (including cable and connectors) that is modeled by Link Model 204, and to a receiver model. that matches the structure of the receiver as described with reference to FIG. 1. The operation of the simulation is governed by a Simulation Control Software (SCSW) 208 and executed by a Computer 210.

To generate a set of ML training data, the SCSW typically inputs a random data sequence to the transmitter model input (e.g., communication packets with a random payload); responsively, the transmitter model generates an output signal, which is input to the link model. The link model applies the link transfer function to the transmitter output and sends the resultant signal to the receiver model.

In embodiments, the SCSW varies the parameters of the communication-path model in a plurality of simulations, to simulate possible variations in the actual communication path. For example, in The transmitter model, the SCSW may add phase, gain, and offset errors, along with non-linearities of various transmitter stages. In the link model, the SCSW may vary the frequency response of the link to represent various cable lengths, fluctuate the cable parameters (e.g., attenuation and characteristic impedance) to represent aging, bends, temperatures, etc., add a return signal to simulate non-matched terminations, and add inter-wire crosstalk. In the receiver model, the SCSW may vary the process-voltage-temperature (PVT), add noise and add crosstalk.

The SCSW monitors the various receiver parameters, along with metrics that are indicative of ink quality corresponding to the different receiver parameters such as SNR and BER The monitored parameters may then be used to train the ML model.

The structure of Data-Transfer Simulation Environment 200, illustrated in FIG. 2 and described hereinabove is an example that is cited for conceptual clarity. Other structures may be used in alternative embodiments. For example, in some embodiments, the simulations may be directed by the NIL training model, emphasizing variations for which the ML model predictions accuracy is low.

Figure 3:
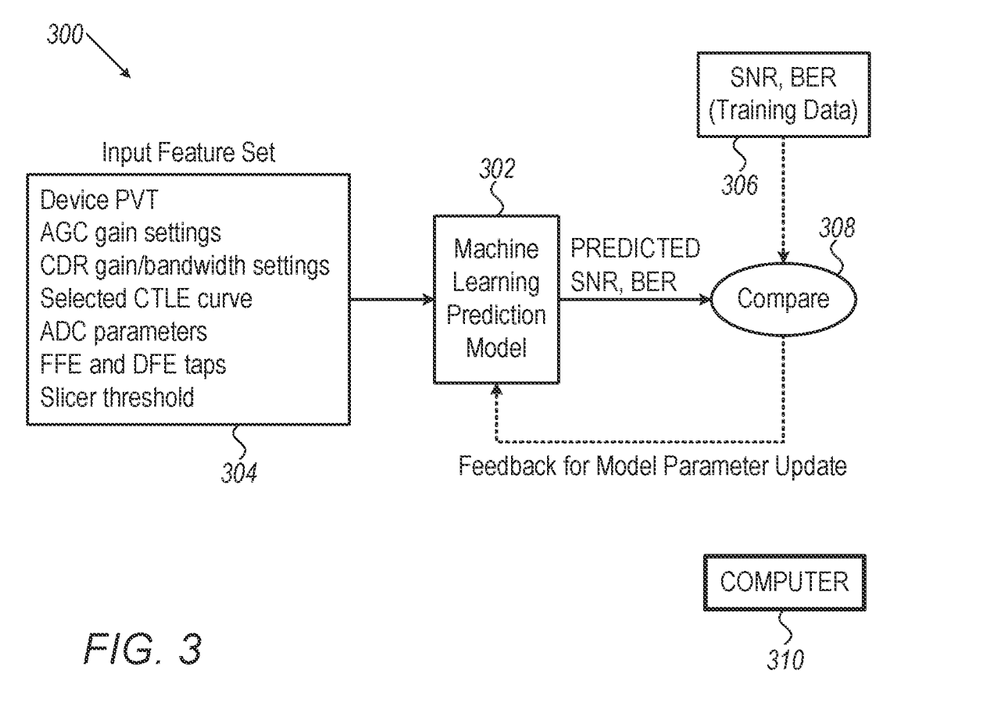
FIG. 3 is a block diagram that schematically illustrates a link quality estimation Mt training environment for the generation of ML parameters of the LQEC of FIG. 1, in accordance with an embodiment that is described herein.

FIG. 3 is a block diagram that schematically illustrates a link quality estimation ML training environment 300 for the generation of ML parameters of a link-quality estimation circuit, in accordance with an. embodiment that is described herein. The ML training environment comprises a Machine-Learning Prediction. Model 302, an Input Feature Set 304, a Training Data input Set 306, and a Comparator 308. The training is governed by a Computer 310.

In an embodiment, Machine-Learning Prediction Model 302 is a multi-layer deep-learning model, which is trained to predict the link quality by adjusting the weights and the activation functions of at least some of the ML model nodes. In embodiments, Machine-Learning Prediction Model 302 may be, for example, an auto-regression deep-learning model, or any other suitable machine learning or deep learning model (For autoregressive techniques background, see, for example, "Deep AutoRegressive Networks", K. Gregor et. al, Proceedings of the 31st International Conference on Machine Learning, Beijing, China, 2014.)

Input. Feature Set 304 is a list of inputs, typically generated by simulation (using, for example, Data-Transfer Simulation Environment 200, FIG. 2). The input may include device PVT and receiver parameters such as AGC gain and others (see the list of LQEC inputs, which was described with reference to FIG. 1).

Comparator 308 is configured to compare the link quality that the machine learning prediction model predicts with the actual link quality (e.g., the SNR and the BER), as calculated during the simulations, and feeds an error gradient back to the machine learning prediction model; the machine learning prediction model can then modify the model parameters to minimize the error.

In an embodiment, the machine learning prediction model attempts to predict link failure within a preset time (e.g., 1 mS); Comparator 308 compares a future value of the link quality to the predicted link quality, so that the difference will represent the error in future link quality prediction.

The configuration of ML Training Environment 300, illustrated in FIG. 3 and described hereinabove, is an example that is cited merely for the sake of conceptual clarity. Other configurations may be used in alternative embodiments. For example, in some embodiments, other link quality measures may be used, such as lost-sync signal generated by a clock-data-recovery (CDR) circuit.

Figure 4:
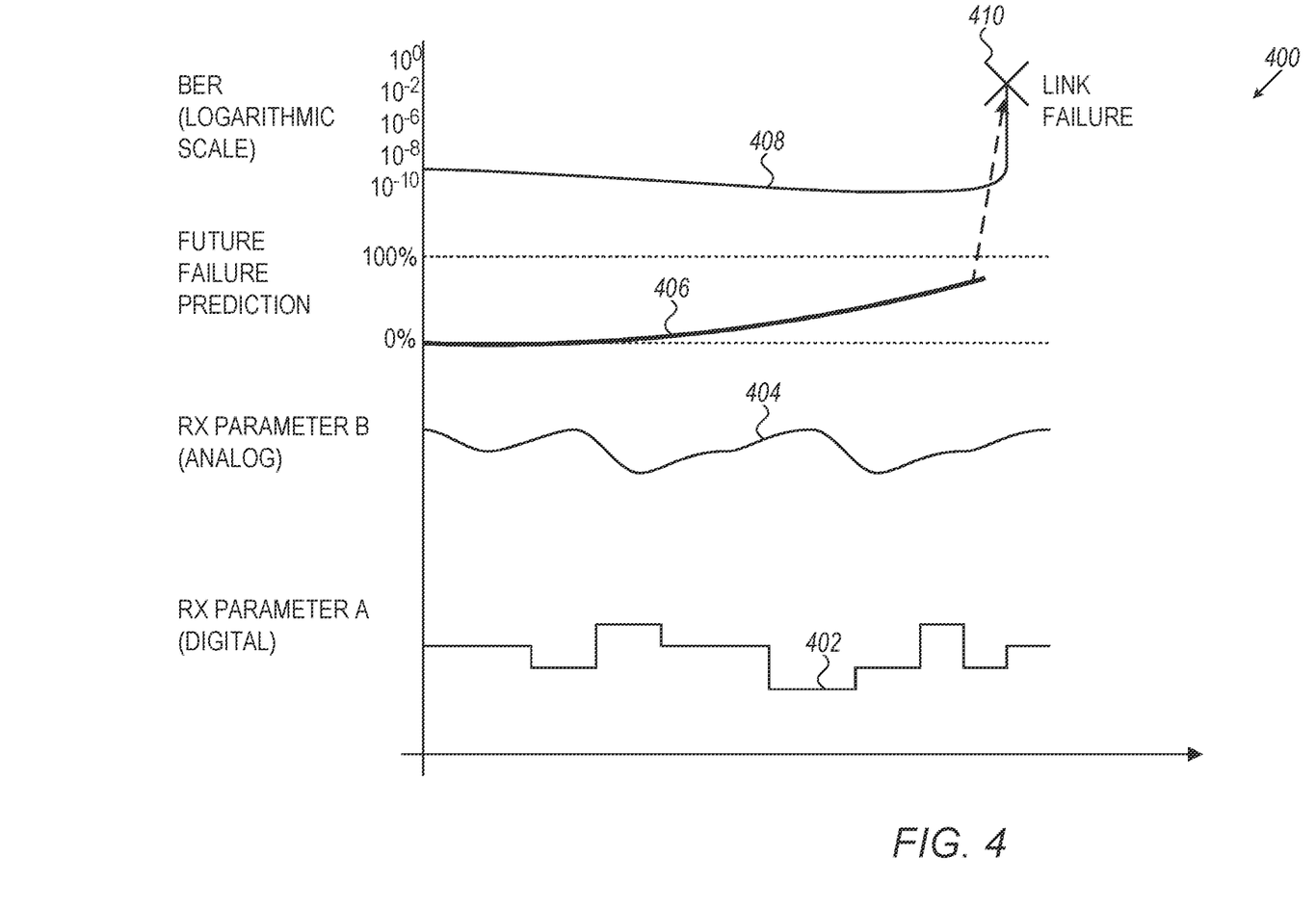
FIG. 4 is a Waveform Graph that schematically illustrates link quality prediction by the LQEC of FIG. 1, in accordance with an embodiment that is described herein.

FIG. 4 is a Waveform Graph 400 that schematically illustrates failure prediction by an LQEC, in accordance with an embodiment that is described herein. According to the graph illustrated in FIG. 4, the LQEC monitors a group of receiver parameters, including a Digital Parameter A 402, and an Analog Parameter B 404.

In some cases, examination of receiver parameters, possibly in combination with signal parameters, over time, can reveal trends that are indicative of future link quality. The LQEC outputs a prediction of the current and future link quality. According to the simplified example of FIG. 4, the prediction of the LQEC is limited to the probability that the link will fail within a preset time interval (e.g., 1 mS).

Curve 406 is the failure prediction that the LQEC outputs, in percentage. Curve 408 is the link quality, in bit-error-rate (BER), represented in a logarithmic scale. As can be observed, the link quality is initially good, with $10^{-10}$ to $10^{-8}$ error rate, until at some point the link fails and the PER rises sharply to $10^{-0}$ (errors in all bits). (The PER numbers cited above are merely an example; in practice, acceptable error rates vary depending on the application and on the error control coding scheme applied.)

When the LQEC is properly trained, link failure may be predicted by monitoring and tracking the trajectory of the receiver parameters. As can be observed, according to the example embodiment illustrated in FIG. 4, the LQEC predicts that the network will fail with a 75% confidence substantially before the link fails. As will be described below, a processor can use this "early warning" to take suitable measures, assuring data integrity.

Waveform Graph 400, illustrated in FIG. 4 and described hereinabove is an example that is merely cited for the sake of conceptual clarity. Other waveforms may represent alternative embodiments. For example, in some embodiments the BER is also an input to the LQEC, improving the prediction accuracy.

In embodiments, a processor may receive the link quality predictions and take suitable measures. We will discuss below two embodiments, with reference to FIGS. 5A, 5B and 6. The embodiments pertain to network devices that are connected to peer network devices through a communication network.

Figure 5A:
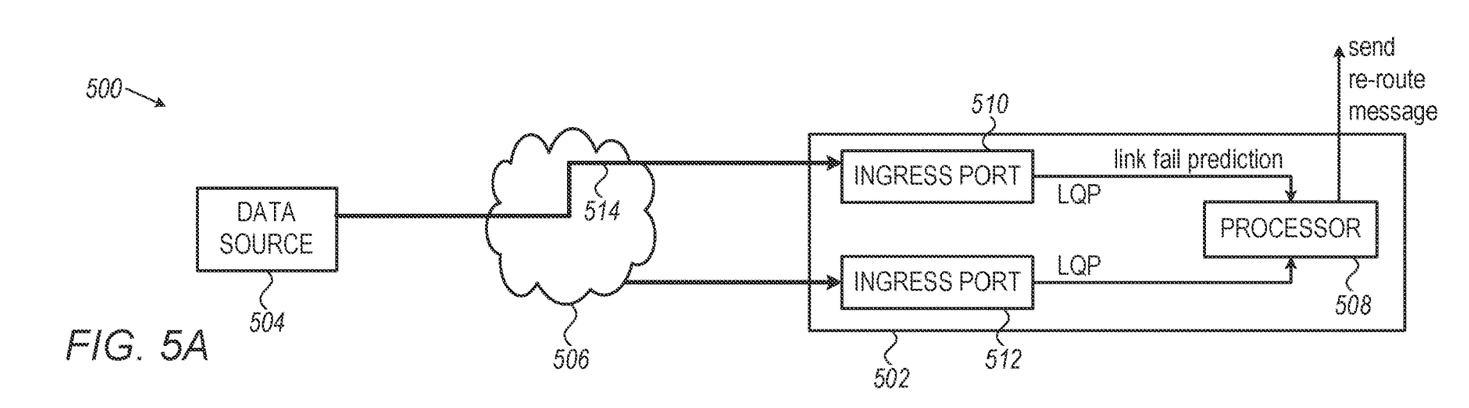
FIG. 5A is a block diagram that schematically illustrates a distributed system with a primary routing path, in accordance with an embodiment that is described herein.

FIG. 5A is a block diagram that schematically illustrates a Distributed System 500 with a primary routing path, in accordance with an embodiment that is described herein. Distributed System 500 may be, for example, a distributed compute system.

A Data Sink 502 receives data from a Data Source 504 over a Communication Network 506, Data Sink 502 and Data Source 504 may be, for example, network devices that are configured to interface with the communication network. Network 506 may be, for example, Ethernet or InfiniBand™ or any other suitable communication network.

The Data Sink comprises a Processor 508 that is configured to carry out a compute task; the processor is coupled to network 506 through a first ingress port. 510 and a second ingress port 512. Data from the data source to the data sink, through network 506, transverses through a primary path. 514 to the first ingress port. 510, and from the ingress port to the processor. Ingress ports 510 and 512 comprise machine-learning based inference circuits that predict the link quality, e.g., LQEC circuits 120, FIG. 1, and each ingress port outputs a Link-Quality Prediction (LQP) signal to the processor. (Path 514 should not be confused with the link described above—path 514 may comprise a plurality of switching nodes, and the link referred to above is the final lag of the path.)

According to the example embodiment illustrated in FIG. 5A, the LQEC of Ingress Port 510 predicts that the input link is about to fail. As explained above, the LQEC has been trained to predict link failure responsively to parameters of the ingress port receiver; thus, the processor receives the link failure indication prior to the actual link failure. Responsively to the failure prediction, the processor may send a message to the data source (e.g., through Network 506), requesting that the data source reroutes further data that the data source sends to the data sink.

Figure 5B:
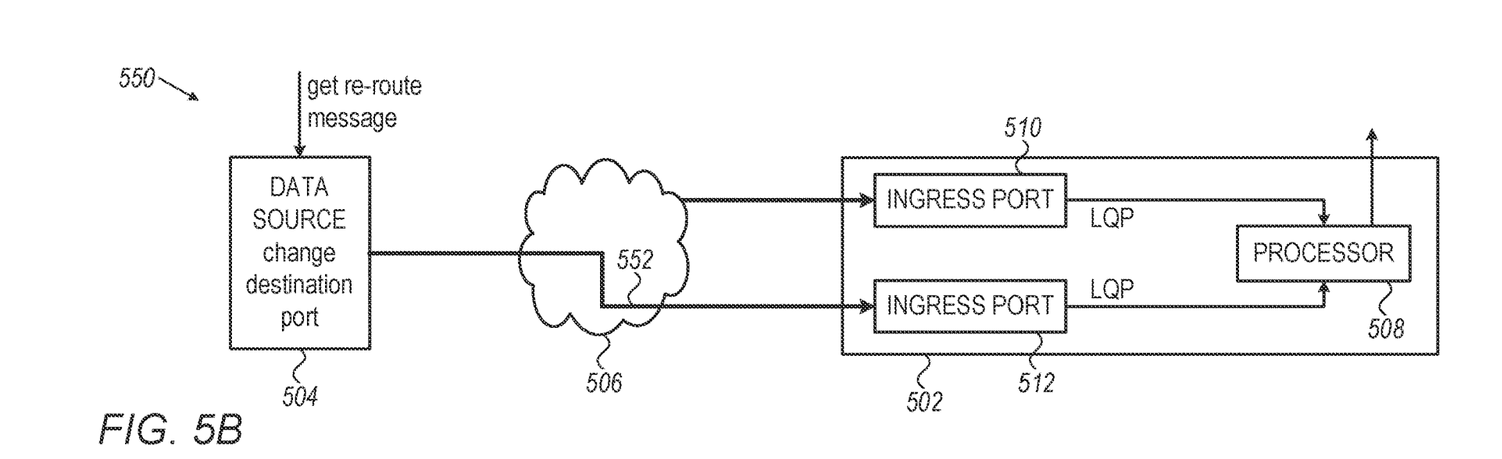
FIG. 5B is a block diagram that schematically illustrates a distributed system with a secondary routing path that is selected responsively to a low link quality prediction, in accordance with an embodiment that is described herein.

FIG. 5B is a block diagram that schematically illustrates a distributed system 550 with a secondary routing path that is selected responsively to a low link quality prediction, in accordance with an embodiment that is described herein. Distributed system 550 is identical to Distributed System 500, except that a different path between the data source 504 and data sink 502 is used. When Data Source 504 receives a reroute message from the data sink, the data source sends further data to the same destination address but to a different destination port. The network then reroutes further data through a secondary path 552, to Ingress Port 512. As the link failure prediction occurs prior to the actual link failure, data integrity may be preserved.

The configuration of Distributed Systems 500, 550, illustrated in FIGS. 5A, 5B and described hereinabove are examples that are cited for conceptual clarity. Other configurations may be used in alternative embodiments. For example, in some embodiments, when the quality of the link degrades, the link can no longer transfer PAM4 data, but can still use NRZ. Processor 508 will, responsively to a link failure prediction, signal to the data source that NRZ should be used for further data transfers. If the LQEC still predicts failure, the processor may request rerouting.

Figure 6:
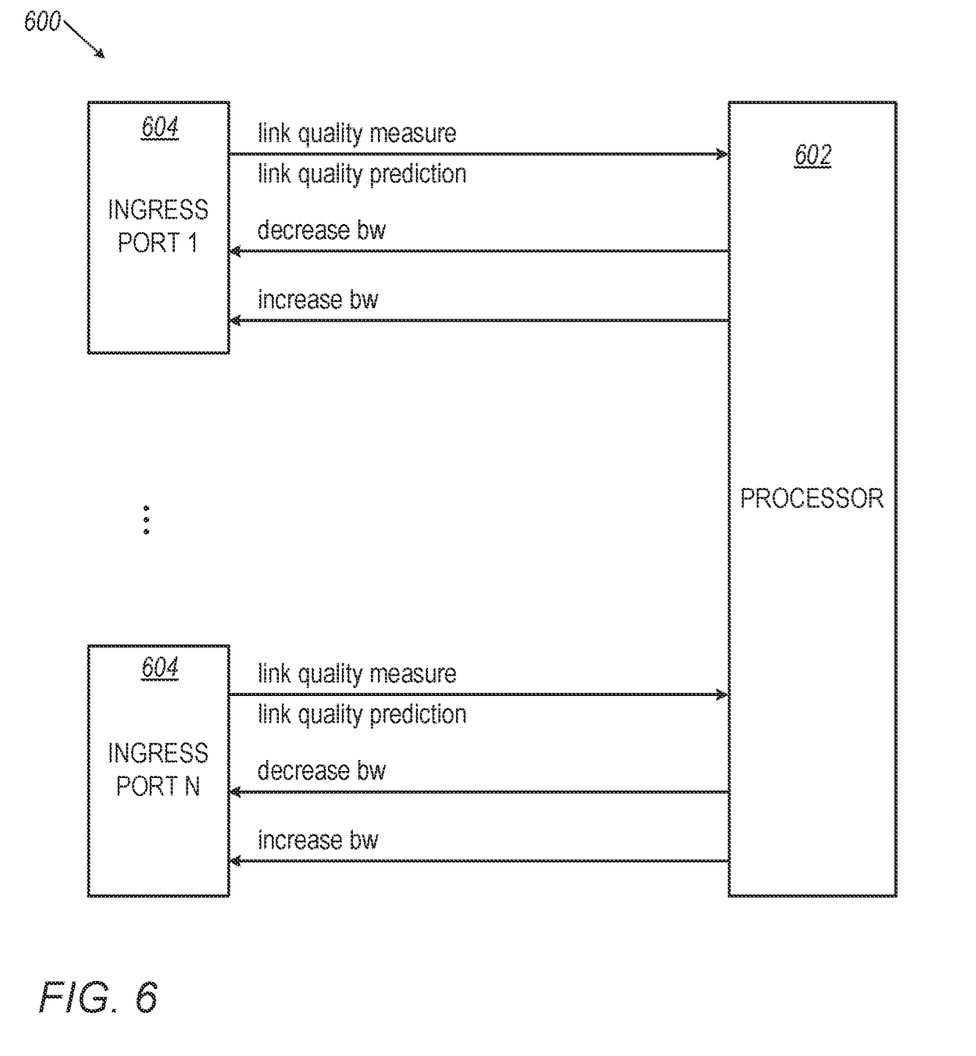
FIG. 6 is a block diagram that schematically illustrates a network device that is configured to optimize the communication performance responsively to link quality predictions, in accordance with an embodiment that is described herein.

FIG. 6 is a block diagram that schematically illustrates a network device 600 that is configured to optimize the communication performance responsively to link quality predictions, in accordance with an embodiment that is described herein. Network device 600 comprises a Processor 602, that is coupled to one or more Ingress Ports 604. Some (or all) of the ingress ports may comprise an LQEC and output a link quality measure and; or a link failure prediction. In an embodiment, processor 600 is at the system level; the processor aggregates the LQEC metrics from all the ports along with other system level quality metrics to generate system level as well as port level quality metrics.

The system level quality metrics are also sometimes referred to as "system health metrics" or "system-level health metrics". In an embodiment, the processor calculates a system-level health metric for a network system (e.g., network device) or part of a network system. The processor may govern traffic distribution depending on such calculated system-level health metric.

In some embodiments, link quality may improve when the transmission rate decreases. According to the example embodiment illustrated in FIG. 6, network device 602 is configured to control the data input rate by signaling a congestion status to the peer network device, which, responsively, lowers the transmission rate. When an ingress port indicates to Processor 602 that the link quality is poor (or predicted to decrease), the processor may control the ingress port to reduce the bandwidth (which, in turn, will result in the sending of congestion notification to the peer network device, and a respective decrease in the communication bandwidth). If the link quality is good, the processor may control the corresponding ingress port to increase the data rate (in embodiments, the peer network device, in the absence of congestion notification, may increase the transmit rate). Thus, in embodiments, a network device may use the link quality indicators and predictions to optimize the communication bandwidth.

The configuration of network device 600 illustrated in FIG. 6 and described above is cited by way of example. Other suitable configurations may be used in alternative embodiments. For example, in some embodiments, the processor sets the bandwidth of the ingress ports (rather than controlling increases and decreases of the bandwidth).

Figure 7A:
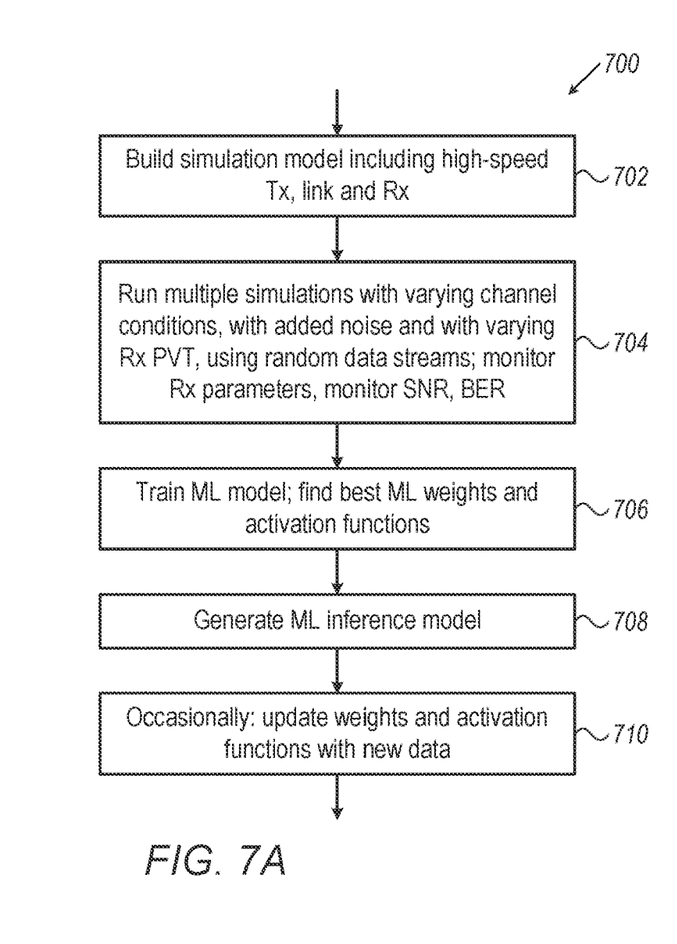
FIG. 7A is a flowchart that schematically illustrates a method for the generation of an ML-based link-quality estimation and prediction model, in accordance with an embodiment that is described herein.

FIG. 7A is a flowchart 700 that schematically illustrates a method for The generation of an ML-based link-quality estimation and prediction model, in accordance with an embodiment that is described herein. The flowchart is executed by a computer (which may be, in embodiments, a multiple-processor computing system).

The flowchart starts at a Build-Simulation-Model operation 702, wherein the computer builds an environment to simulate a target data path, including a high-speed wireline transmitter (Tx), a link, and a high-speed wireline receiver (Rx) (an example simulation model was described above, with reference to FIG. 2).

Next, at a Run Simulations operation 704, the computer runs numerous simulations on the simulation model, with varying conditions, including: i) random input patterns; ii) signal distortion in the transmitter (e.g., phase noise, gain noise, non-linear distortions); iii) varying link conditions (e.g., gain and phase responses); iv) crosstalk noise; v) PVT variations of the receiver; and vi) random added noise. The computer monitors the BEE, SNR and the receiver parameters.

At a Train ML Model operation 706, the computer trains the ML model, applying the monitored values of the simulations, and attempting to find a set of weights and activation functions that will minimize the prediction error, using, for example, an auto-regression mechanism (the training process was described above, with reference to FIG. 3).

Next, at a Generate Inference Model 708, the computer generates the inference model that is to be implemented in the receiver, including all weights and activation functions. In some embodiments, the inference model runs on a low power inference processor embedded within each receiver; in other embodiments, a system level CPU aggregates the metrics from multiple receiver instantiations and runs the inference model. In embodiments, the inference model can be improved "in the field" at an Update Weights operation 710, wherein the computer runs further simulations with newly acquired data (for example, if some or all the network cables are replaced with a new type).

Thus, according to the example method illustrated in FIG. 7A and described hereinabove, an ML link-quality estimator/predictor for the purpose of avoiding data loss (and, in an embodiment, for the purpose of increasing overall communication capacity) can be built and trained, using a set of parameters derived by full communication path simulations with varying conditions.

The configuration of flowchart 700, illustrated in FIG. 7A and described hereinabove, is cited as an example. Other configurations may be used in alternative embodiments. For example, in some embodiments, the simulation may be adjusted to prefer conditions in which the error of the prediction is high; for example, if the prediction error is higher at high receiver temperature, more simulations may be run with high receiver temperatures.

Figure 7B:
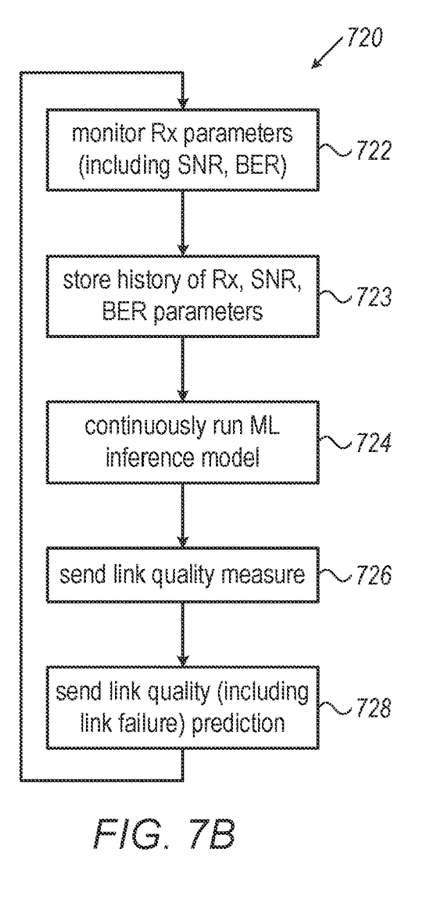
FIG. 7B is a flowchart that schematically illustrates a method for estimating and predicting the link quality, in accordance with an embodiment that is described herein.

FIG. 7B is a flowchart. 720 that schematically illustrates a method for estimating and predicting the link quality, in accordance with an embodiment that is described herein. The flowchart is a continuous loop, executed by LQEC 120 (FIG. 1). At a Monitor Rx Parameters operation 722, the LQEC monitors the various receiver parameters (an example list of monitored receiver parameters was described above, with reference to FIG. 1).

Next, in a Store history operation 723, the LQEC stores the history of the RX parameters. In various embodiments, the depth of the stored history may be preset separately for the various parameters. In an embodiment, the history of the parameters as well as the parameters are needed for the link quality estimation and prediction.

The LQEC then, in a Run ML Inference Model operation 724, runs the ML inference model on the monitored receiver parameters (and, in embodiments, on the history of the parameters), applying the preset weights and activation functions. The LQEC then, at a Send Link Quality Estimation operation 726 sends the link quality estimate (e.g., to a processor); and, at a Send Link Quality Prediction operation. 728, sends the predicted link quality. After operation. 728, the LQEC loops back to operation 722.

The configuration of flowchart 720, illustrated in FIG. 7B and described hereinabove, is an example that is cited for the sake of conceptual clarity. Other configurations may be used in alternative embodiments. For example, in embodiments, all or some of the operations are executed concurrently; in an embodiment, link quality prediction comprises predictions for various time delays, including a prediction with no time delay (and, in this case, operation 726 may be skipped).

in other embodiments, the LQEC outputs the link quality prediction only and does not output the current link quality (the processor may estimate the link quality by observing the BER).

Figure 7C:
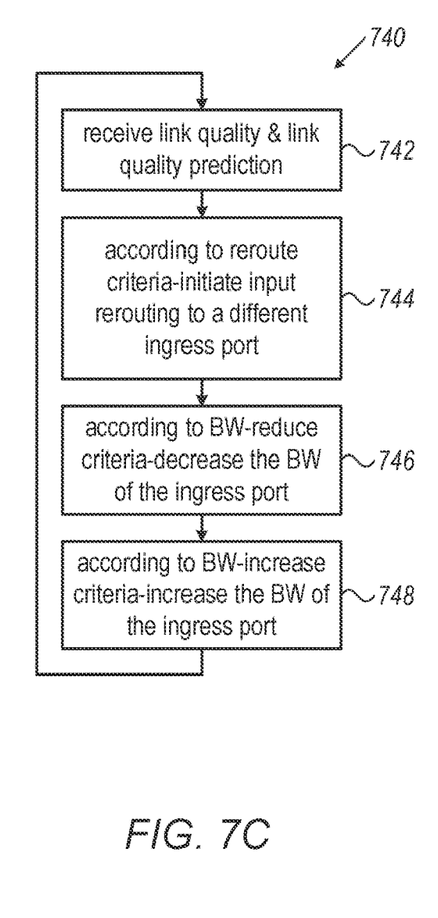
FIG. 7C is a flowchart that schematically illustrates a method for utilizing the link quality estimate and the link quality prediction to improve the performance of a network device, in accordance with an embodiment that is described herein.

FIG. 7C is a flowchart 740 that schematically illustrates a method for utilizing the link quality estimate and the link quality prediction to improve the performance of a network device, in accordance with an embodiment that is described herein. The flowchart is executed by a processor (e.g., processor 602, FIG. 6).

The flowchart starts at a Receive Link Quality and Link Quality Prediction operation 742, wherein the processor receives link quality and link quality predictions pertaining to one or more ingress ports. Next, at an Initiate-Input-Reroute operation 744, the processor may, responsively to the link quality estimates and predictions and according to a preset reroute criteria, initiate routing of the ingress data to a different (unused) ingress port (the rerouting mechanism was described above, with reference to FIGS. 5A, 5B).

The processor thein enters a Decrease-Bandwidth operation 746, wherein the processor may decrease the bandwidth of the ingress port, responsively to a low link quality estimate or a low link quality prediction, and according to a preset bandwidth-decrease criteria. In embodiments, the processor may use one or more techniques to reduce the bandwidth, including, for example, diverting some of the traffic to other links, changing the encoding scheme (e.g., from PAM4 to NRZ) and others.

Lastly, at an Increase Bandwidth operation 748, the processor may increase the bandwidth of the ingress port, responsively to a high link quality estimate or a high link quality prediction and according to a preset bandwidth-increase criteria (bandwidth-decrease and bandwidth increase were described above, with reference to FIG. 6).

The configuration of flowchart 740, illustrated in FIG. 7C and described hereinabove is cited as an example. Other suitable configurations may be used in alternative embodiments. For example, in some configurations, rerouting is done only if decreasing the bandwidth fails to significantly alter the link failure prediction.

The configuration of Receiver 100, including LEQC 120; the configuration of simulation environment 200, training environment 300, distributed system 500 and network device 600; the methods of flowcharts 700, 720 and 740 are example configurations and methods that are shown purely for the sake of conceptual other suitable configurations and methods can be used in alternative embodiments.

In various embodiments, the various ML training, ML inference and network device elements tasks described hereinabove may be carried out by hardware, by software, or by combination of hardware and software.

In various embodiments, LQEC 120 may be implemented using suitable hardware, such as one or more Application-Specific Integrated. Circuits (ASIC) or Field-Programmable Gate Arrays (FPGA), or a combination of ASIC and FPGA.

Any or all of processors 508 and 602, computer 210 and computer 310 typically comprise one or more generalpurpose processors, which are programmed in software to carry out the functions described herein. The software may be downloaded to the processor in electronic form, over a network, for example, or it may, alternatively additionally, be provided and/or stored on non-transitory tangible media, such as magnetic, optical, or electronic memory.

Although the embodiments described herein mainly address link quality estimation and predictions in high-speed wireline receivers, the methods and systems described herein can also be used in other wireline communication application that utilizes an adaptive equalized receiver to recover the transmitted messages, such as automotive applications, compute application leveraging PCIE/CXL Link layer; and, mutatis mutandis, in wireless applications.

It is thus noted that the embodiments described above are cited by way of e-sample, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An Integrated Circuit (IC) for use in a network device, the IC comprising:
   a receiver, which is configured to receive a signal over a link and to process the received signal; and
   a Link Quality Estimation Circuit (LQEC), which is configured to run an Artificial Prediction (AI) model that predicts a link quality measure indicative of a probability that the link will fail within a future time interval having a predefined length, wherein the AI model predicts the link quality measure by analyzing at least one or more settings of circuitry of the receiver, and to initiate a responsive action depending on the predicted link quality measure.

2. The apparatus according to claim 1, wherein the LQEC is configured to initiate the responsive action by initiating a diversion of subsequent communication, at least partially, from the link to another link.

3. The apparatus according to claim 1, wherein, by analyzing the settings of the circuitry of the receiver over time, the LQEC is configured to predict a future value or trend of the link quality measure, and to initiate the responsive action depending on the predicted future value or trend.

4. The apparatus according to claim 1, wherein the LQEC is configured to predict the link quality measure by jointly analyzing (i) the one or more settings of the circuitry of the receiver, and (ii) one or more parameters of the received signal.

5. The apparatus according to claim 1, wherein the LQEC is configured to initiate the responsive action by initiating a decrease of a data rate of the signal.

6. The apparatus according to claim 1, wherein the LQEC is configured to initiate the responsive action by initiating a change in an encoding scheme used for encoding the signal.

7. The apparatus according to claim 1, wherein the LQEC is configured to predict the link quality measure by analyzing, over time, at least one setting of the circuitry of the receiver, selected from among:
   a gain of a Clock Data Recovery (CDR) circuit;
   a bandwidth of the CDR circuit;
   a response of an analog equalization filter;
   a setting of an Analog to Digital Converter (ADC);
   tap values of a digital equalizer;
   an Automatic Gain Control (AGC) setting; and
   a slicer threshold.

8. The apparatus according to claim 1, wherein the receiver is disposed in a deserializer.

9. A method for use in a network device, the method comprising:
   using a receiver, receiving a signal over a link and processing the received signal;
   running an Artificial Prediction (AI) model that predicts a link quality measure indicative of a probability that the link will fail within a future time interval having a predefined length, wherein the AI model predicts the link quality measure by analyzing at least one or more settings of circuitry of the receiver; and
   initiating a responsive action depending on the predicted link quality measure.

10. The method according to claim 9, wherein initiating the responsive action comprises initiating a diversion of subsequent communication, at least partially, from the link to another link.

11. The method according to claim 9, wherein analyzing the settings of the circuitry of the receiver over time comprises predicting a future value or trend of the link quality measure, and wherein initiating the responsive action is performed depending on the predicted future value or trend.

12. The method according to claim 9, wherein predicting the link quality measure comprises jointly analyzing (i) the one or more settings of the circuitry of the receiver, and (ii) one or more parameters of the received signal.

13. The method according to claim 9, wherein initiating the responsive action comprises initiating a decrease of a data rate of the signal.

14. The method according to claim 9, wherein initiating the responsive action comprises initiating a change in an encoding scheme used for encoding the signal.

15. The method according to claim 9, wherein predicting the link quality measure comprises analyzing, over time, at least one setting of the circuitry of the receiver, selected from among:
   a gain of a Clock Data Recovery (CDR) circuit;
   a bandwidth of the CDR circuit;
   a response of an analog equalization filter;
   a setting of an Analog to Digital Converter (ADC);
   tap values of a digital equalizer;
   an Automatic Gain Control (AGC) setting; and
   a slicer threshold.

16. The method according to claim 9, wherein the receiver is disposed in a deserializer.

* * * * *